(12) United States Patent
Greco et al.

(10) Patent No.: US 12,458,421 B2
(45) Date of Patent: Nov. 4, 2025

(54) SCREW-IN-SCREW BONE FIXATION SYSTEM

(71) Applicant: DePuy Synthes Products, Inc., Raynham, MA (US)

(72) Inventors: Steven Greco, West Chester, PA (US); Seung Kyu Daniel Kwak, Wayne, PA (US); Timothy Josephson, Greenlawn, NY (US); Philip Watt, New Holland, PA (US); Jeffrey Loftus-Vergari, Media, PA (US)

(73) Assignee: DePuy Synthes Products, Inc., Raynham, MA (US)

( * ) Notice: Subject to any disclaimer, the term of this patent is extended or adjusted under 35 U.S.C. 154(b) by 580 days.

(21) Appl. No.: 17/126,199

(22) Filed: Dec. 18, 2020

(65) Prior Publication Data

US 2022/0192720 A1 Jun. 23, 2022

(51) Int. Cl.
*A61B 17/86* (2006.01)
(52) U.S. Cl.
CPC ........ *A61B 17/864* (2013.01); *A61B 17/8605* (2013.01)
(58) Field of Classification Search
None
See application file for complete search history.

(56) References Cited

U.S. PATENT DOCUMENTS

| | | | |
|---|---|---|---|
| 928,997 A | 7/1909 | Mueller | |
| 3,019,686 A | * 2/1962 | Behrle | F16B 15/00 D8/391 |
| 3,474,537 A | 10/1969 | Christensen | |
| 4,338,835 A | 7/1982 | Simons | |
| 4,759,766 A | 7/1988 | Buettner-Janz et al. | |
| 5,038,978 A | 8/1991 | Kolton et al. | |
| 5,140,877 A | 8/1992 | Sloan | |
| 5,207,529 A | 5/1993 | Bailey | |
| 5,251,521 A | 10/1993 | Burda et al. | |
| 5,425,767 A | 6/1995 | Steininger et al. | |
| 5,443,469 A | 8/1995 | Smith | |
| 5,505,731 A | * 4/1996 | Tornier | A61B 17/7055 606/261 |

(Continued)

FOREIGN PATENT DOCUMENTS

CN 1665459 A 9/2005
CN 101094618 A 12/2007

(Continued)

*Primary Examiner* — Zade Coley
(74) *Attorney, Agent, or Firm* — BakerHostetler (57) ABSTRACT

A bone fixation system includes a first anchor, a second anchor, and a third anchor. The first anchor is configured to be inserted into a first target location within a bone. The first anchor including a first head and a first shaft that extends from the first head and is configured to couple the first anchor to the first target location. The first head defines a head bore extending therethrough along a head bore axis. The first shaft defines a shaft bore extending therethrough along a shaft bore axis. The second anchor is sized to extend through the head bore and out of the head bore so as to couple to a second target location within the bone. The third anchor is sized to extend through the shaft bore and out of the shaft bore to a third target location within the bone.

15 Claims, 8 Drawing Sheets

(56) References Cited

U.S. PATENT DOCUMENTS

| | | | |
|---|---|---|---|
| 5,779,705 A * | 7/1998 | Matthews | A61B 17/72 606/62 |
| 5,797,918 A | 8/1998 | Mcguire et al. | |
| 5,899,941 A | 5/1999 | Nishijima et al. | |
| 5,984,681 A * | 11/1999 | Huang | A61C 8/0009 433/173 |
| 5,993,463 A | 11/1999 | Truwit et al. | |
| 6,013,078 A | 1/2000 | Lin | |
| 6,113,637 A | 9/2000 | Gill et al. | |
| 6,168,598 B1 | 1/2001 | Martello | |
| 6,270,499 B1 * | 8/2001 | Leu | A61B 17/725 606/62 |
| 6,467,919 B1 | 10/2002 | Rumsey et al. | |
| 6,517,541 B1 * | 2/2003 | Sesic | A61B 17/725 606/62 |
| 6,648,892 B2 | 11/2003 | Martello | |
| 6,695,844 B2 | 2/2004 | Bramlet et al. | |
| 6,849,093 B2 * | 2/2005 | Michelson | A61F 2/446 623/17.11 |
| 7,004,629 B2 | 2/2006 | Shrader et al. | |
| 7,094,242 B2 | 8/2006 | Ralph et al. | |
| 7,163,540 B2 | 1/2007 | Martello | |
| 7,198,643 B2 | 4/2007 | Zubok et al. | |
| 7,198,644 B2 | 4/2007 | Schultz et al. | |
| 7,229,448 B2 * | 6/2007 | Goble | A61B 17/8645 606/98 |
| 7,326,248 B2 * | 2/2008 | Michelson | A61F 2/446 623/17.11 |
| 7,524,326 B2 | 4/2009 | Dierks | |
| 7,597,713 B2 | 10/2009 | Baumgartner et al. | |
| 7,883,513 B2 | 2/2011 | Ralph et al. | |
| 7,887,590 B2 | 2/2011 | Levieux | |
| 7,981,114 B2 | 7/2011 | Zander | |
| 8,361,157 B2 | 1/2013 | Bouttens et al. | |
| 8,591,513 B2 * | 11/2013 | Overes | A61B 17/68 606/319 |
| 8,771,271 B2 | 7/2014 | Overes | |
| 8,821,546 B2 * | 9/2014 | Vaughan | A61B 17/8625 606/246 |
| 8,945,136 B2 | 2/2015 | Overes | |
| 8,956,356 B2 | 2/2015 | Zurschmiede | |
| 9,060,808 B2 * | 6/2015 | Overes | A61B 17/68 |
| 9,084,646 B2 * | 7/2015 | Sevrain | F16B 39/04 |
| 9,204,911 B2 | 12/2015 | Overes et al. | |
| 9,247,975 B2 * | 2/2016 | Erhart | A61B 17/863 |
| 9,289,275 B2 * | 3/2016 | Zhao | A61C 8/0043 |
| 9,480,507 B2 | 11/2016 | Overes et al. | |
| 9,532,817 B2 | 1/2017 | Overes | |
| 9,636,154 B2 | 5/2017 | Frigg et al. | |
| 9,861,411 B2 * | 1/2018 | Parent | A61B 17/68 |
| 10,045,804 B2 * | 8/2018 | Sevrain | F16B 39/04 |
| 10,751,097 B2 * | 8/2020 | Tyber | A61B 17/1717 |
| 2002/0128712 A1 * | 9/2002 | Michelson | A61F 2/446 606/301 |
| 2002/0133156 A1 * | 9/2002 | Cole | A61B 17/725 606/62 |
| 2003/0135216 A1 * | 7/2003 | Sevrain | A61B 90/92 606/328 |
| 2003/0171753 A1 | 9/2003 | Collins et al. | |
| 2003/0199876 A1 | 10/2003 | Brace et al. | |
| 2004/0111161 A1 | 6/2004 | Trieu | |
| 2005/0018931 A1 | 1/2005 | Shrader et al. | |
| 2005/0033438 A1 | 2/2005 | Schultz et al. | |
| 2005/0107791 A1 | 5/2005 | Manderson | |
| 2006/0052787 A1 | 3/2006 | Re et al. | |
| 2006/0064095 A1 | 3/2006 | Senn et al. | |
| 2006/0116676 A1 | 6/2006 | Gradel et al. | |
| 2006/0189991 A1 * | 8/2006 | Bickley | A61F 2/0811 623/13.12 |
| 2007/0112354 A1 | 5/2007 | Iwasaki et al. | |
| 2007/0191952 A1 | 8/2007 | Bernero | |
| 2007/0213729 A1 | 9/2007 | Lindemann et al. | |
| 2007/0270846 A1 | 11/2007 | Metzinger | |
| 2007/0270848 A1 * | 11/2007 | Lin | A61B 17/746 606/65 |
| 2008/0140130 A1 | 6/2008 | Chan et al. | |
| 2008/0183171 A1 * | 7/2008 | Elghazaly | A61B 17/7241 606/301 |
| 2008/0221623 A1 | 9/2008 | Gooch | |
| 2008/0221624 A1 | 9/2008 | Gooch | |
| 2008/0243253 A1 | 10/2008 | Levieux | |
| 2009/0120852 A1 | 5/2009 | Ellsworth et al. | |
| 2009/0326545 A1 | 12/2009 | Schaffhausen | |
| 2010/0023064 A1 * | 1/2010 | Brunger | A61B 17/8605 606/301 |
| 2010/0121324 A1 | 5/2010 | Tyber et al. | |
| 2010/0121325 A1 | 5/2010 | Tyber et al. | |
| 2010/0145397 A1 * | 6/2010 | Overes | A61B 17/8038 606/319 |
| 2010/0160924 A1 | 6/2010 | Soliman | |
| 2010/0167240 A1 | 7/2010 | Benzon et al. | |
| 2010/0256638 A1 * | 10/2010 | Tyber | A61B 17/7291 606/62 |
| 2010/0256639 A1 * | 10/2010 | Tyber | A61B 17/1775 606/62 |
| 2010/0312280 A1 * | 12/2010 | Overes | A61B 17/68 606/279 |
| 2010/0324556 A1 | 12/2010 | Tyber et al. | |
| 2011/0022066 A1 * | 1/2011 | Sevrain | A61B 17/86 606/151 |
| 2011/0118739 A1 | 5/2011 | Tyber et al. | |
| 2011/0125153 A1 | 5/2011 | Tyber et al. | |
| 2011/0137312 A1 * | 6/2011 | Mantovani | A61B 17/7233 606/63 |
| 2011/0160729 A1 * | 6/2011 | Overes | A61B 17/7241 606/286 |
| 2011/0184470 A1 * | 7/2011 | Gorek | A61B 17/7011 606/279 |
| 2011/0213367 A1 * | 9/2011 | Tyber | A61B 17/72 606/62 |
| 2011/0230884 A1 | 9/2011 | Mantzaris et al. | |
| 2011/0230920 A1 * | 9/2011 | Gorek | A61B 17/7001 606/305 |
| 2011/0282398 A1 * | 11/2011 | Overes | A61B 17/8877 606/310 |
| 2012/0330313 A1 | 12/2012 | Grady et al. | |
| 2013/0325076 A1 | 12/2013 | Palmer et al. | |
| 2015/0142055 A1 * | 5/2015 | Overes | A61B 17/68 606/246 |
| 2018/0161079 A1 * | 6/2018 | Tyber | A61B 17/8605 |
| 2019/0336189 A1 * | 11/2019 | Cundiff | A61F 2/30 |

FOREIGN PATENT DOCUMENTS

| | | |
|---|---|---|
| CN | 101102730 A | 1/2008 |
| CN | 102292043 A | 12/2011 |
| EP | 0330328 A1 | 8/1989 |
| EP | 1354562 A1 | 10/2003 |
| EP | 1658816 A1 | 5/2006 |
| EP | 1779794 A1 | 5/2007 |
| JP | 54-118566 | 8/1979 |
| JP | 2001-252283 A | 9/2001 |
| JP | 2001-520071 A | 10/2001 |
| JP | 2003-518408 A | 6/2003 |
| JP | 2006-514238 A | 4/2006 |
| JP | 2007-275570 A | 10/2007 |
| KR | 10-2011-7015221 | 9/2011 |
| WO | 99/47061 A1 | 9/1999 |
| WO | 00/38586 A1 | 7/2000 |
| WO | 00/69352 A1 | 11/2000 |
| WO | 2006/016384 A1 | 2/2006 |
| WO | 2006/119092 A2 | 11/2006 |
| WO | 2007/048038 A2 | 4/2007 |
| WO | 2007/098288 A2 | 8/2007 |
| WO | 2009/092907 A2 | 7/2009 |
| WO | 2009/149371 A1 | 12/2009 |
| WO | 2010/065855 A1 | 6/2010 |
| WO | 2011/112619 A1 | 9/2011 |
| WO | 2011/155931 A1 | 12/2011 |

* cited by examiner

SCREW-IN-SCREW BONE FIXATION SYSTEM

TECHNICAL FIELD

The present disclosure relates to bone fixation systems, assemblies, and associated surgical methods and procedures for using the same.

BACKGROUND

A variety of fixation devices for the reduction of bone or bone fragments are well known. For example, external bone fixation devices, or external fixators, are used to reduce fractures of the long bones in the human body. Internal bone fixation devices, such as bone plates, are also commonly used to reduce bone fractures.

Many fixation devices are attached to underlying bone using bone anchors, which can include screws, pins, nails, and the like. For example, a conventional bone plate includes screw holes that accommodate bone screws that are drilled into underlying bone on opposing sides of a fracture to join bone segments together. Unfortunately, the attachment of bone fixation devices to the underlying bone can become compromised if, for example, the screw becomes dislodged from the bone during normal anatomical function.

The foregoing background discussion is intended solely to aid the reader. It is not intended to limit the innovations described herein. Thus, the foregoing discussion should not be taken to indicate that any particular element of a prior system is unsuitable for use with the innovations described herein, nor is it intended to indicate that any element is essential in implementing the innovations described herein.

SUMMARY

Bone fractures are one of the most common orthopaedic trauma procedures. In particular, fractures to the distal radius are some of the most common fractures treated. Distal radius fractures are generally treated based on their severity. Less complex fractures can often be stabilized with a cast after being set and pins can be used to provide additional stabilization. A comminuted fracture can utilize open reduction internal fixation (ORIF) plating that includes a bone plate and anchoring screw/s. However, ORIF plating can lead to soft tissue irritation and other undesired outcomes due to the prominence and position of the plating on the exterior of the bone.

An improved bone fixation system and method of insertion is desired to treat fractures that are too complex to be addressed via pins, wires, and/or casting, and that may be too small for plating and other fixation components without additional hardware protruding from the bone that could lead to tissue irritation or other medical complications.

An aspect of the present disclosure provides a bone fixation system. The bone fixation system comprises a first anchor, a second anchor, and a third anchor. The first anchor is configured to be inserted into a first target location within a bone. The first anchor includes a first head and a first shaft that extends from the first head and is configured to couple the first anchor to the first target location. The first head defines a head bore extending therethrough along a head bore axis. The first shaft defines a shaft bore extending therethrough along a shaft bore axis. The second anchor is sized to extend through the head bore and out of the head bore so as to couple to a second target location within the bone. The third anchor is sized to extend through the shaft bore and out of the shaft bore to a third target location within the bone.

Another aspect of the present disclosure provides a bone anchor. The bone anchor is configured to be disposed within a distal radius. The bone anchor comprises a head and a shaft. The head defines a head bore extending therethrough along a head bore axis. The shaft extends from the head, and is configured to couple the bone anchor to a target location within the distal radius. The shaft defines a shaft bore extending therethrough along a shaft bore axis.

Another aspect of the present disclosure provides a method of fixing a bone fixation system to a first bone segment of a distal radius and to a second bone segment of the distal radius. The method comprises: inserting a first anchor into a first target location within the distal radius, the first anchor including a first head and a first shaft that extends from the first head, the first head defining a head bore extending therethrough along a head bore axis, the first shaft defining a shaft bore extending therethrough along a shaft bore axis; inserting a second anchor through the head bore and out of the head bore so as to couple to a second target location within the distal radius; and inserting a third anchor through the shaft bore and out of the shaft bore to a third target location within the distal radius.

This summary is provided to introduce a selection of concepts in a simplified form that are further described below in the Detailed Description section. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

The foregoing summary, as well as the following detailed description of illustrative embodiments of the present application, will be better understood when read in conjunction with the appended drawings. For the purposes of illustrating the present application, there are shown in the drawings illustrative embodiments of the disclosure. It should be understood, however, that the application is not limited to the precise arrangements and instrumentalities shown. In the drawings.

DETAILED DESCRIPTION

Certain terminology used in this description is for convenience only and is not limiting. The words "top", "bottom", "distal", "proximal", "leading", "trailing", "inner", "outer", "above", "below", "axial", "transverse", "circumferential," and "radial" designate directions in the drawings to which reference is made. The term "substantially" is intended to mean considerable in extent or largely but not necessarily wholly that which is specified. All ranges disclosed herein are inclusive of the recited endpoint and independently combinable (for example, the range of "from 2 grams to 10 grams" is inclusive of the endpoints, 2 grams and 10 grams, and all the intermediate values). The terminology includes the above-listed words, derivatives thereof and words of similar import.

Figure 1:
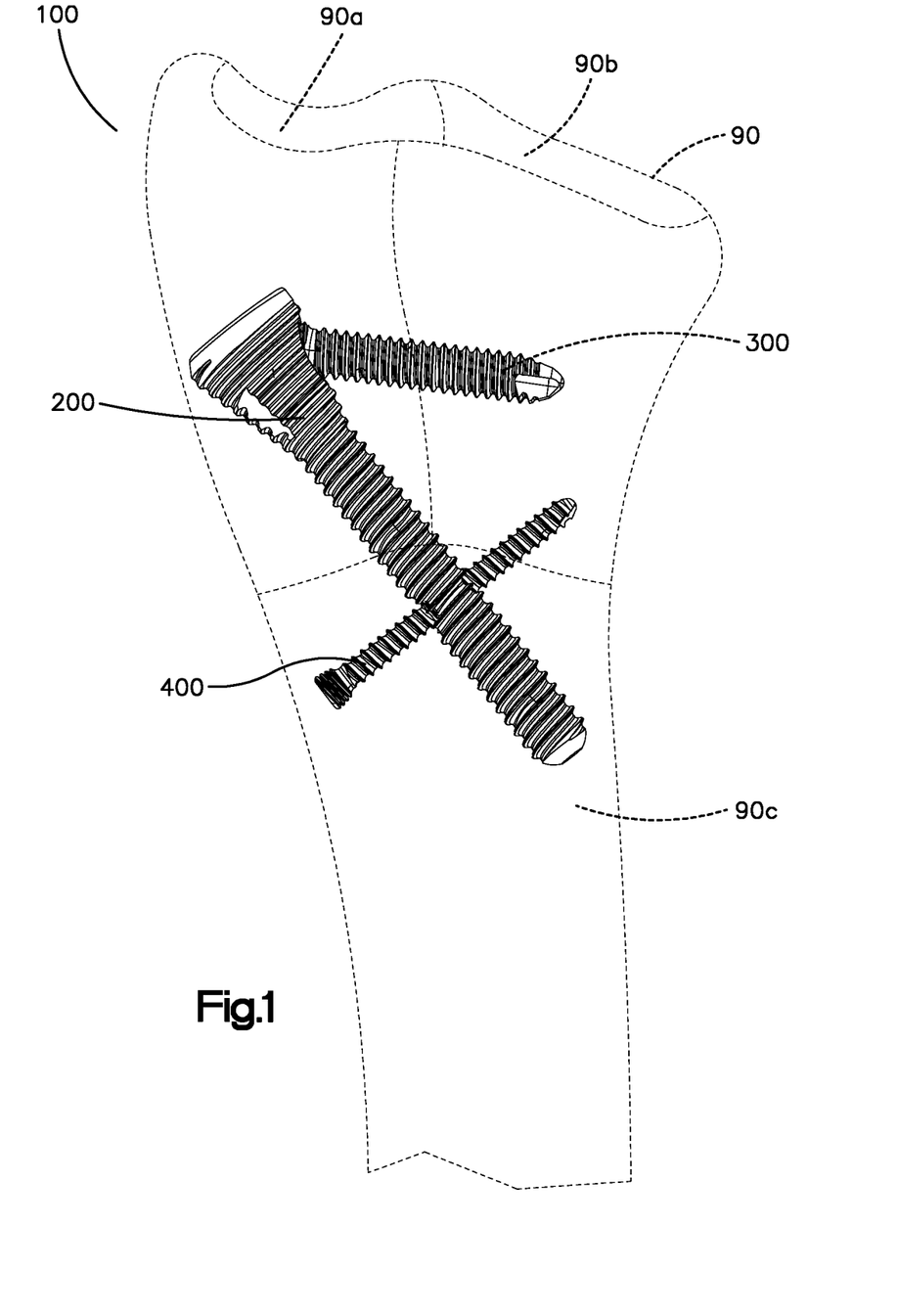
FIG. 1 illustrates an anchor-in-anchor fixation system attached to an underlying structure or bone, according to an aspect of this disclosure.

Referring now to FIG. 1, the fixation system 100 can be configured as a bone fixation system in accordance with one example, including a first bone anchor 200. The first bone anchor 200 includes a head 202 and a shaft 204 that extends from the head 202 along a central longitudinal axis $L_1$ (e.g. shaft axis or central axis). The first bone anchor 200 can include at least one head bore 216 that extends through the head 202, and at least one shaft bore 205 that extends through the shaft 204. Thus, the bone fixation system 100 can include at least one auxiliary head anchor 300 that is configured to be inserted through the at least one head bore 216 and into the bone. The bone fixation system 100 can further include at least one auxiliary shaft anchor 400 that is configured to be inserted through the at least one shaft bore 205 and into the bone. In this regard, both the at least one auxiliary head anchor 300 and the at least one auxiliary shaft anchor 400 are received by the first bone anchor 200. Unless otherwise indicated, the bone fixation system 100 and its components, including the bone anchors, can be manufactured from any suitable biocompatible material known in the art including but not limited to titanium, titanium allow such as TAN, stainless steel, reinforced plastics, allograft bone, and the like.

Referring now to FIGS. 2-6, the first bone anchor 200 includes a head 202 (e.g. first head) and a shaft 204 (e.g. first shaft). The shaft 204 extends from the head 202 longitudinally along a central shaft axis $L_1$. The shaft 204 defines longitudinally opposing proximal, or upper, and distal, or lower, ends 204a and 204b, respectively. The head 202 is positioned at the proximal end 204a of the shaft 204. As used herein, the term "proximal" or "proximal end" refers to an end that is closer to the medical professional during the medical procedure than the distal end, and the term "distal" or "distal end" refers to an end that is further from the medical professional during the medical procedure than the proximal end. Further, the term "proximal direction" refers to a direction that extends towards the medical professional during the medical procedure, while the term "distal direction" refers to a direction that extends away from the medical professional during the medical procedure.

Figure 4:
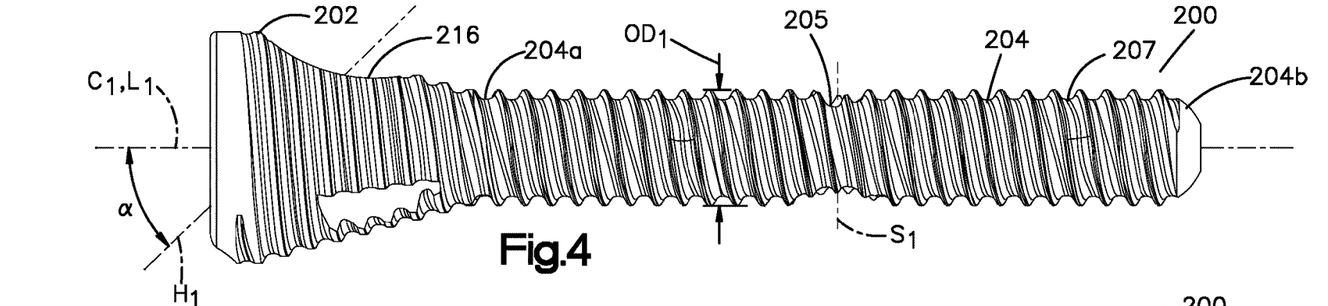
FIG. 4 illustrates a first side elevation view of the bone anchor shown in FIG. 2.

The shaft 204 includes threads 206 that extend radially out from the shaft 204 at locations at and between the proximal and distal ends 204a and 204b. The threads 206 are configured to engage underlying bone, and thus, the entirety of the shaft 204 can be threaded. Alternatively, the shaft 204 may include portions that are unthreaded. For example, the shaft portion 204 located toward the distal end 204b can be threaded, and the shaft portion 204 located toward the upper end 204a may be unthreaded. As illustrated in FIG. 4, the threads 206 define an outer diameter $OD_1$ that is substantially constant along the shaft 204 from the proximal end 204a to the distal end 204b. Alternatively, the outer diameter $OD_1$ of the threads 206 may increase from a direction from the distal end 204b toward the proximal end 204a. Accordingly, the threads 206 disposed at the proximal end 204a may define an outer diameter that is greater than the outer diameter of the threads 206 disposed at the distal end 204b. It will be appreciated that the first bone anchor 200 can provide as a locking screw. Alternatively, the first bone anchor 200 can be provided as a compression screw, a nail, a rivet, or a pin whose shaft is smooth or ribbed, as desired.

As illustrated in FIG. 4, the threads 206 define an outer diameter $OD_1$ that is substantially constant along the shaft 204 from the proximal end 204a to the distal end 204b. Alternatively, the outer diameter $OD_1$ of the threads 206 may increase from a direction from the distal end 204b toward the proximal end 204a. Accordingly, the threads 206 disposed at the proximal end 204a may define an outer diameter that is greater than the outer diameter of the threads 206 disposed at the distal end 204b. It will be appreciated that the first bone anchor 200 can provide as a locking screw.

Figure 5A:
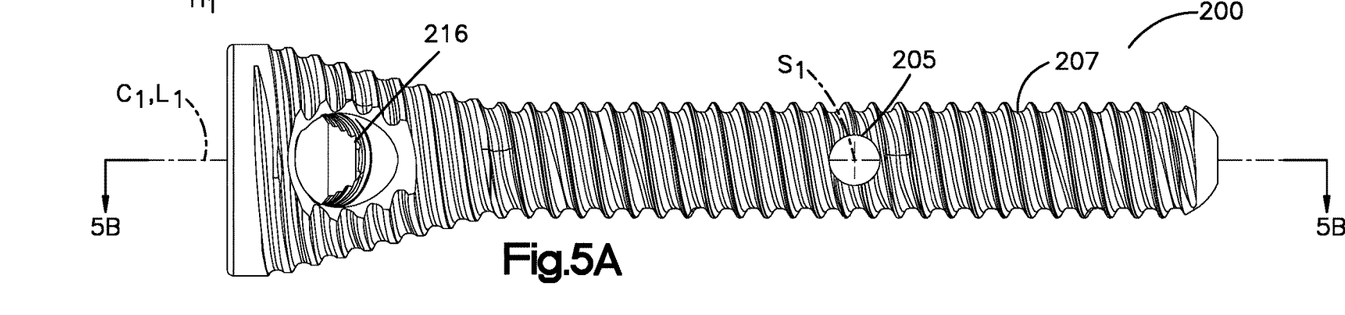
FIG. 5A illustrates a second side elevation view of the bone anchor shown in FIG. 2.
Figure 5B:
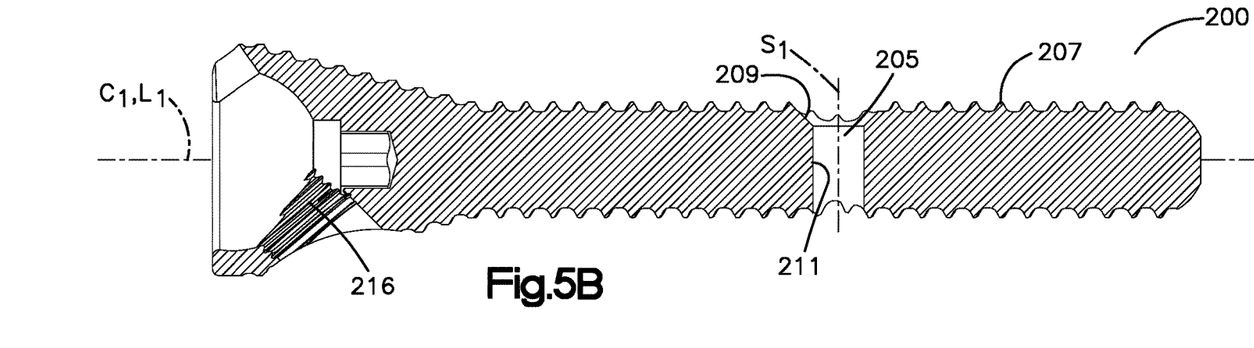
FIG. 5B illustrates a cross-sectional view of the bone anchor taken along line 5B-5B in FIG. 5A.
Figures 6, 7:
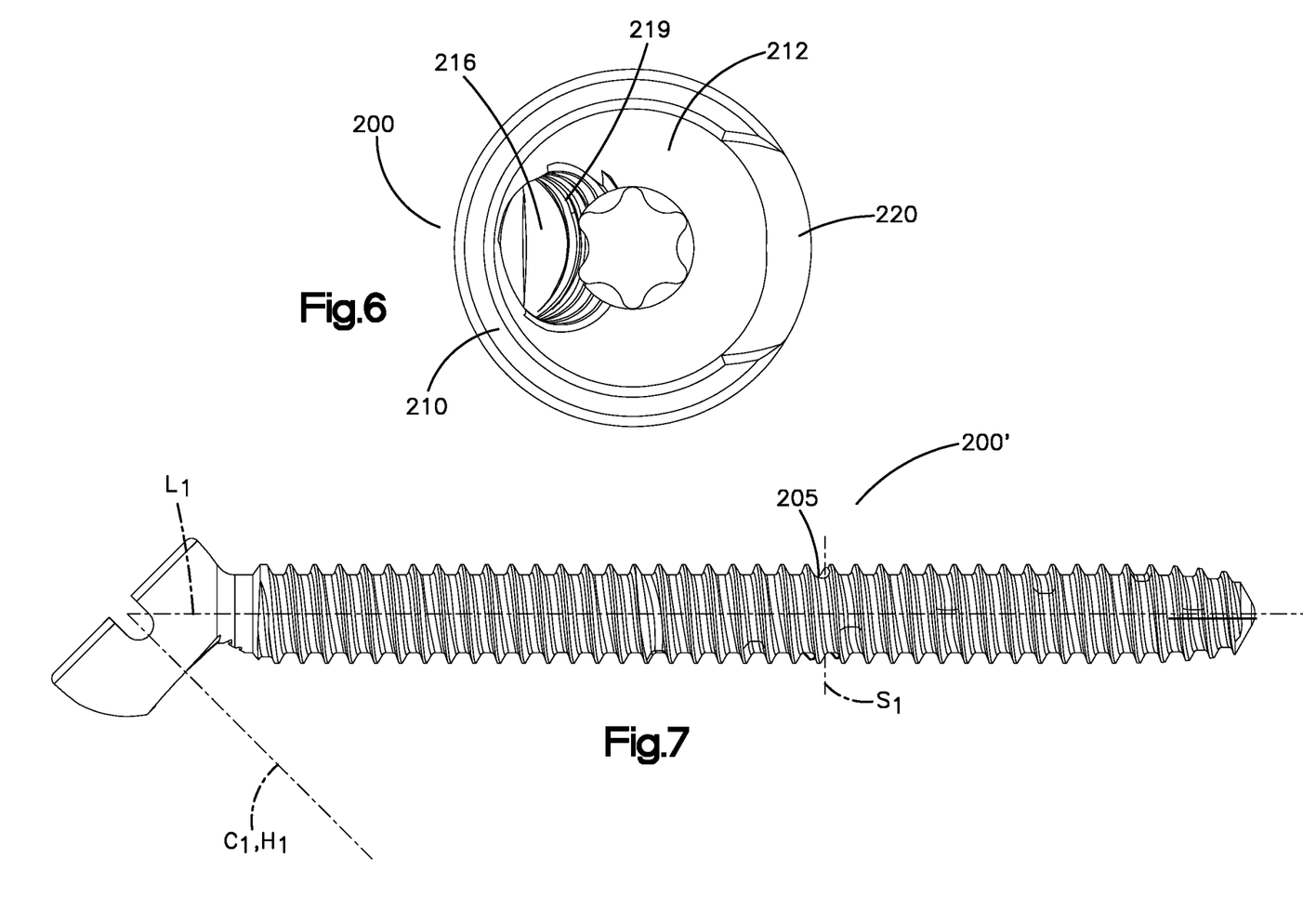
FIG. 6 illustrates an end view of the bone anchor shown in FIG. 2.
FIG. 7 illustrates a first side elevation view of an alternative aspect of a bone anchor, according to an aspect of this disclosure.

With reference to FIGS. 4, 5A, and 5B, the shaft 204 defines at least one shaft bore 205 that extends through the shaft 204 from one location on an outer surface 207 of the shaft 204 to another location on the outer surface 207. The shaft bore 205 is located between the proximal end 204a and the distal end 204b of the shaft 204. The shaft bore 205 extends about a shaft bore axis $S_1$ and may have a substantially cylindrical shape. As illustrated, the shaft bore axis $S_1$ is substantially perpendicular to the central axis $L_1$ of the shaft 204. Alternatively, the shaft bore axis $S_1$ may extend at angles that are non-perpendicular to the central axis $L_1$ as desired. It will be appreciated that the shaft 204 may alternatively define more than one shaft bore (see FIG. 13).

The shaft bore 205 can be enclosed by the shaft 204 along a plane that is oriented perpendicular to the shaft bore axis S1. The shaft bore 205 is configured to receive the at least one auxiliary shaft anchor 400 (e.g. third bone anchor) within. The shaft bore 205 can include helical threads that extend helically continuously about an inner surface within the bore 205. Alternatively, the shaft bore 205 can be partially threaded or unthreaded, to receive the third bone anchor 400 within. The shaft bore 205 can have a cross-sectional dimension (e.g. diameter) that is substantially circular. In an aspect, the diameter of the shaft bore 205 is less than a cross-sectional dimension (e.g. diameter) of the head bore 216.

The shaft bore 205 can include a first portion 209 that extends from a first location on the outer surface 207 to a second portion 211. The second portion 211 extends from the first portion 209 to a second location on the outer surface 207. The first portion 209 can define a substantially conical shape that is tapered toward the second portion 111. Thus, a cross-sectional dimension of the first portion 209 at the outer surface 207 is greater than a cross-sectional dimension of the first portion 209 at a location spaced from the outer surface 207 toward the second portion 211. When the auxiliary shaft anchor 400 is inserted into the shaft bore 205, a head 402 of the auxiliary shaft anchor 400 can abut the first portion 209. In some examples, the first portion 209 can be unthreaded. In other examples, the first portion 209 can be threaded, such that the first portion 209 and the head 402 of the auxiliary shaft anchor 400 threadedly mate with each other. In an aspect, the head 402 of the auxiliary shaft anchor 400 can be entirely nested within the first portion 209 of the shaft bore 205. Thus, no portion of the head 402 extends out from the first portion 209 along the shaft axis S1. It should be appreciated, however, that a portion of the head 402 can alternatively extend out with respect to the outer surface 207 of the shaft. The second portion 211 can define a substantially cylindrical shape configured to receive a shaft 404 of the auxiliary shaft anchor 400.

Figure 2:
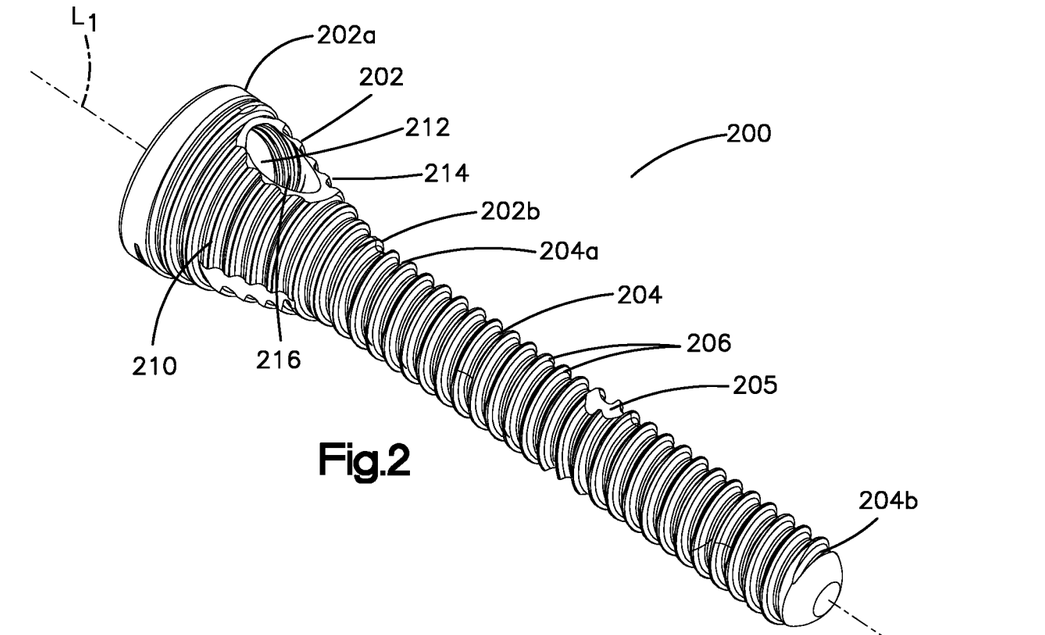
FIG. 2 illustrates a first side perspective view of a bone anchor, according to an aspect of this disclosure.
Figure 3:
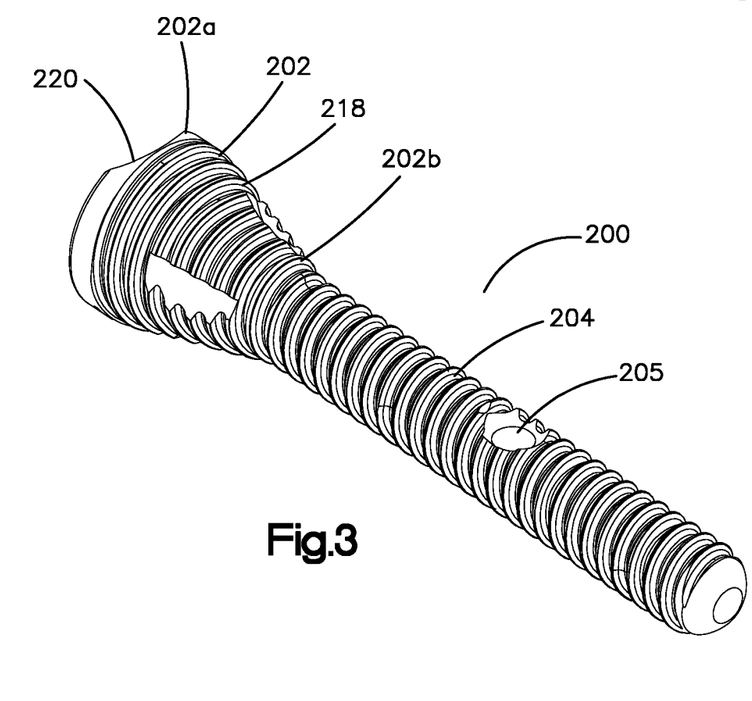
FIG. 3 illustrates a second side perspective view of the bone anchor shown in FIG. 2.

With reference to FIG. 2, the head 202 includes an annular body 210 that defines a radially inner surface 212, an opposing radial outer surface 214, a proximal, or upper, end 202a, and a distal, or lower, end 202b. The annular body 210 can define a shape of a segment of a cone. For example, the outer surface 214 of the head 202 can taper radially outward in a direction from the distal end 202b toward the proximal end 202a. The distal end 202b having a cross-sectional dimension (e.g. diameter) that is less than a cross-sectional dimension (e.g. diameter) of the proximal end 202a. In an alternative aspect, the annular body 210 can define the shape of a segment of a sphere, having a cross-sectional dimension that is greater at a location between the proximal and distal ends 202a and 202b. Accordingly, the outer surface 214 can be spherical or otherwise convex. In other alternative aspects, the head 202 can assume any other suitable alternative shape as desired.

The distal end 202b of the head 202 is located adjacent to proximal end 204a of the shaft 204. Alternatively, the distal end 202b of the head 202 may be spaced apart from the proximal end 204a of the shaft 204 by a neck (not shown). The neck may include a threaded region and/or an unthreaded region.

The head 202 includes helical threads 218 that extend radially out from the head 202 at locations at and between the proximal and distal ends 202a and 202b. The threads 218 are configured to engage underlying bone, and thus, the entirety of the head 202 can be threaded. Alternatively, the head 202 may be unthreaded and/or may be partially threaded. For example, the portion of the head 202 located toward the distal end 202b can be threaded, and the portion of the head 202 located toward the proximal end 202a may be unthreaded.

The outer surface 214 of the head 202 extends concentrically about a central head axis $C_1$, and can define a frustum. The central head axis $C_1$ extends in a direction normal with respect to the proximal and distal ends 202a and 202b of the head 202. In an aspect, a cross-sectional dimension of the outer surface 214 may increase in a direction from the distal end 202b of the head 202 to the proximal end 202a. Alternatively, the head 202 may include any suitable shape as desired, such as a segment of a sphere, having a diameter or cross-sectional dimension that is greater at a location between the proximal and distal ends 202a and 202b than at either of the proximal or distal ends 202a and 202b.

The head 202 may also include a slot 220 positioned at the proximal end 202a. The slot 220 extends from an edge of the head 202 defining the proximal end 202a toward the distal end 202b. The slot 220 is configured to receive a tool within to prevent the first bone anchor 200 from rotating during assembly and/or insertion of the fixation system 100 into the bone 90. The head 202 can include one or more slots 220 as desired.

The inner surface 212 of the head 202 defines at least one head bore 216 extending through the annular body 210 along a central bore axis $H_1$ (see FIG. 4). The central bore axis $H_1$ extends angularly offset with respect to the central axis $L_1$ such that the shaft 204 does not interfere with the bore 216. In an aspect, the head bore axis $H_1$ extends within the same plane as the shaft bore axis $S_1$. In an aspect, the head bore axis $H_1$ can intersect with the shaft bore axis $S_1$ at a location outside the bone anchor 200. The head 202 includes a plurality of helical threads 219 in the head bore 216 that extend radially inward from the radially inner surface 212 of the annular body 210. In an aspect, the head bore 216 may be devoid of threads or partially threaded. The central bore axis $H_1$ of the head bore 216 intersects with the central axis $L_1$ of the shaft 204 so as to define an acute angle $\alpha$. The angle $\alpha$ may be between 0° and 90°. In an aspect, the angle $\alpha$ may be between approximately 20° and 70°. In another aspect, the angle $\alpha$ may be between approximately 40° and 50°. In yet another aspect, the angle $\alpha$ may be approximately 45°. The one or more slots 220 may compose a portion of the head bore 216. It will be appreciated that the head 202 may alternatively define more than one head bore (see FIGS. 13 and 14).

The inner surface 212 of the head 202 can further define a hexagonal or any alternatively shaped structure that can be engaged by a screw driving instrument to rotate the head 202 as the first bone anchor 200 is being secured to a bone.

The central head axis $C_1$ of the head 202 and the central axis $L_1$ of the shaft 204 are substantially coaxial. Both of the central head axis $C_1$ and the axis $L_1$ are angularly offset from the central bore axis $H_1$ of the bore 216. Alternatively, the central head axis $C_1$ may be coaxial with the central bore axis $H_1$, such that both of the central head axis $C_1$ and the central bore axis $H_1$ are angularly offset from the central axis $L_1$ of the shaft 204. For example, referring to FIG. 7, the shaft 204 of the first bone anchor 200 can be angularly offset with respect to either or both of the central head axis $C_1$ and the central bore axis $H_1$. Further, the central bore axis $H_1$ can be parallel to or coincident with the central head axis $C_1$. Alternatively, the central head axis $C_1$ and the central bore axis $H_1$ can be angularly offset from each other.

Figure 8:
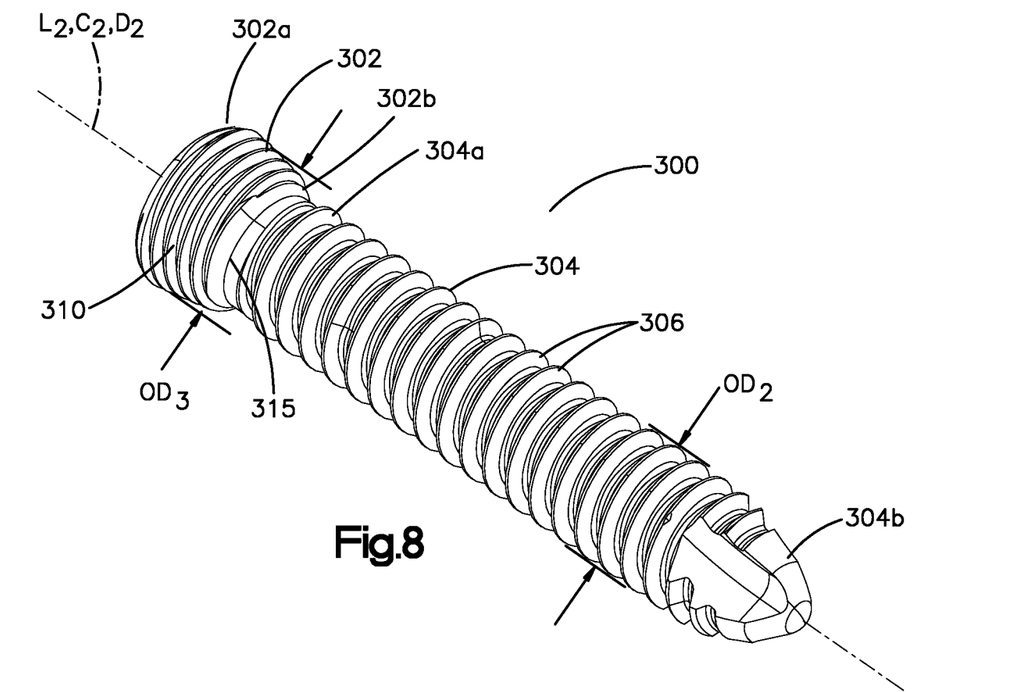
FIG. 8 illustrates a front perspective view of a second aspect of a bone anchor, according to an aspect of this disclosure.
Figure 9:
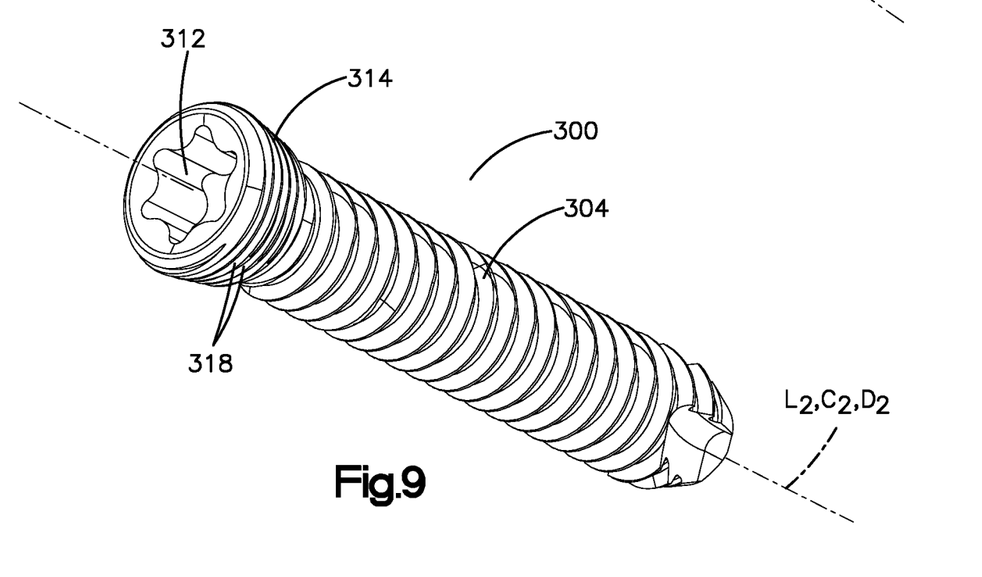
FIG. 9 illustrates a back perspective view of the bone anchor shown in FIG. 8.

The auxiliary head anchor 300 (e.g. second bone anchor) will now be described with reference to FIGS. 8-9, in particular, as described above, the second bone anchor 300 can include a head 302 and a shaft 304 that extends from the head 302 along a respective central shaft axis $L_2$. The shaft 304 can be longer, shorter, or substantially equal to the longitudinal length of the shaft 204 of the first bone anchor 200. The shaft 304 defines longitudinally opposing proximal, or upper, and distal, or lower, ends 304a and 304b, respectively. The head 302 extends from the proximal end 304a of the shaft 304. The auxiliary head anchor 300 can include at least one helical thread 306 that extends radially out from the shaft 304. The helical thread 306 can extend out from any location of the shaft 304 as desired. For instance, in one example, the helical thread 306 can extend from the proximal end 304a to the distal end 304b. Thus, the substantial entirety of the shaft 304 can be threaded. Alternatively, the helical thread can extend along any portion of the shaft 304 between the proximal end 304a and the distal end 304b. The distal end 304b can include cutting flutes, or can be configured to be driven into a pre-drilled hole. The helical thread 306 can be configured to threadedly purchase with the underlying bone. The threads 306 define an outer diameter $OD_2$ that is constant across the proximal and distal ends 304a and 304b as illustrated. Alternatively, the outer diameter of the threads 36 can increase in a proximal direction from the distal end 304b toward the proximal end 304a as described above with respect to the shaft 204 of the first bone anchor 200. The outer diameter $OD_2$ can be greater than, less than, or substantially equal to the outer diameter $OD_1$. The threads 306 can define the same pitch or a different pitch with respect to the threads 206 of the first bone anchor 200.

The head 302 includes an annular body 310 that defines a radially inner surface 312 an opposing radially outer surface 314, a proximal, or upper, end 302a and a distal, or lower, end 302b. The outer surface 314 extends concentrically about an axis $C_2$, and can define the shape of a frustum as illustrated having an outer diameter $OD_3$ or cross-sectional dimension that increases in a direction from the distal end 302b of the head 302 toward the proximal end 302a. Alternatively, the head 302 can assume any suitable alternative shape as desired, such as a segment of a sphere as illustrated, having a cross sectional dimension (e.g. diameter) that is greater at a location between the proximal and distal ends 302a and 302b than at either of the proximal and distal ends 302a and 302b. In the illustrated embodiment, the central axis $C_2$ is parallel and coincident or aligned with the longitudinal axis $L_2$ of the shaft 304, though it should be appreciated that the central axis $C_2$ could be angularly offset from the longitudinal axis $L_2$ if desired.

The distal end 302b of the head 302 is coupled to the proximal end 304a of the shaft 304, either directly as illustrated, or indirectly via an unthreaded neck 315 of the type described above with respect to the first bone anchor 200. The head 302 includes helical threads 318 that extend radially out from the outer surface 314 of the annular body 310. It will be appreciated that the second bone anchor 300 can provide as a locking screw as illustrated. Alternatively, the second bone anchor 300 can be provided as a compression screw, a nail, rivet, or pin whose shaft is smooth or ribbed, as desired.

The head 302 further defines a central axis $D_2$ defined by the proximal and distal ends 302a and 302b. In particular, the central axis $D_2$ extends in a direction normal with respect to the proximal and distal ends 302a and 302b. Because the central axis $C_2$ of the head 302 extends parallel to the direction extending between the proximal and distal ends 302a and 302b in the illustrated embodiment, the axes $C_2$ and $D_2$ are coincident or aligned, and thus extend parallel and coincident or aligned with the longitudinal axis $L_2$ in the illustrated embodiment. It will be appreciated that the proximal and distal ends 302a and 302b can be geometrically configured such that the axes $C_2$ and $D_2$ are angularly offset from each other.

The threads 318 of the head 302 define an outer diameter $OD_3$ that increases in a direction from the distal end 302b of the head 302 to the proximal end 302a of the head 302. Thus, the outer diameter of the threads 318 is greater at the proximal end 302a than at the distal end 302b. The inner diameter of the threads 219 of the head bore 216 of the first bone anchor 200 can define a cross-sectional dimension (e.g. an inner diameter) that increases in a direction from a distal end to a proximal end of the bore 216, such that the threads 318 of the head 302 of the second anchor member 300 are configured to mate with the threads 219 of the head bore 216 of the first anchor member 200. It will be appreciated that the cross-sectional dimensions (e.g. diameters) of the threads 219 and 318 can be constant across the corresponding proximal and distal ends.

Figure 10:
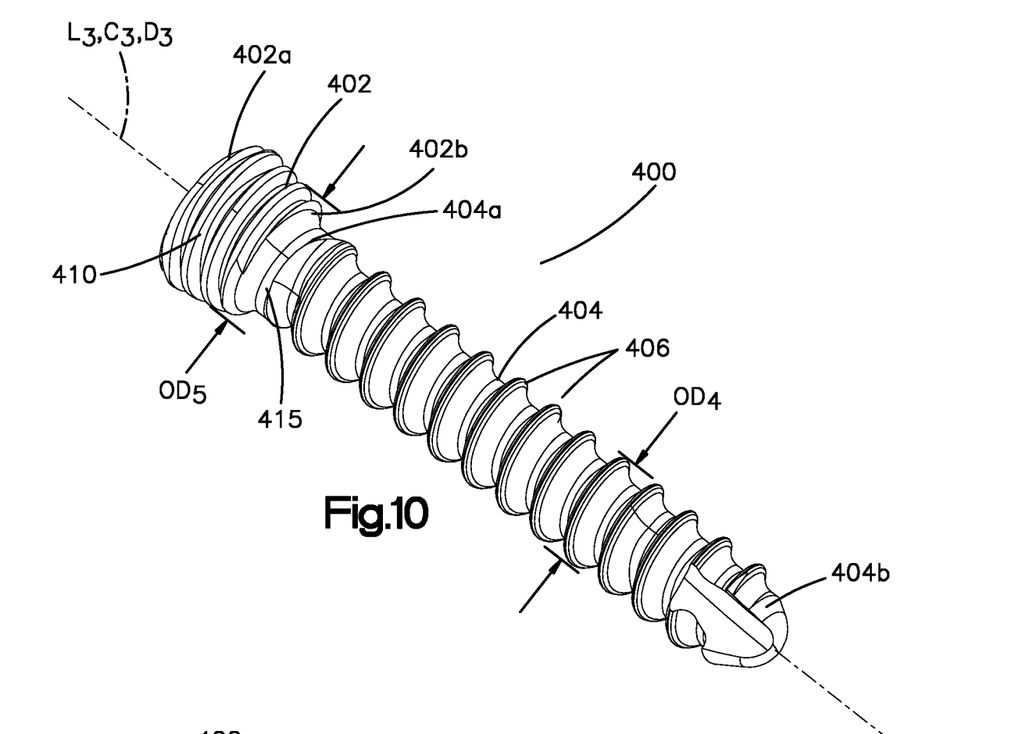
FIG. 10 illustrates a front perspective view of a third aspect of a bone anchor, according to an aspect of this disclosure.
Figure 11:
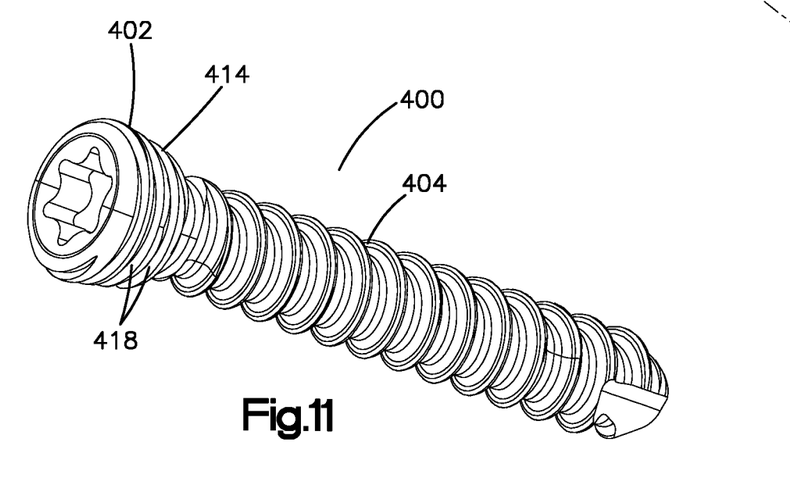
FIG. 11 illustrates a back perspective view of the bone anchor shown in FIG. 10.

The auxiliary shaft anchor 400 will now be described with reference to FIGS. 10-11. The third bone anchor 400 includes the head 402 and the shaft 404 that extends from the head 402 along a respective central axis $L_3$. The shaft 404 can be longer, shorter, or substantially equal to the longitudinal length of the shaft 204 of the first bone anchor 200 or the shaft 304 of the second bone anchor 300. The shaft 404 defines longitudinally opposing proximal, or upper, and distal, or lower, ends 404a and 404b, respectively. The third bone anchor 400 includes a head 402 that extends from the proximal end 404a of the shaft 404. The third bone anchor 400 can include aspects that are substantially similar to the aspects of the second bone anchor 300.

Helical threads 406 extend radially out from the shaft 404 at locations at and between the proximal and distal ends 404a and 404b that are configured to engage underlying bone. Thus, the substantial entirety of the shaft 404 can be threaded. The threads 406 define an outer diameter $OD_4$ that is constant across the proximal and distal ends 404a and 404b as illustrated, though the threads 406 can alternatively increases in a direction from the distal end 404b toward the proximal end 404a as described above with respect to the shaft 204 of the first bone anchor 200. The outer diameter $OD_4$ can be greater than, less than, or substantially equal to the outer diameter $OD_1$ of the shaft 204 of the first bone anchor 200 or the outer diameter $OD_2$ of the shaft 304 of the second bone anchor 300. The threads 406 can define the same pitch or a different pitch with respect to the threads 206 of the first bone anchor 200 and the threads 306 of the second bone anchor 300. In an aspect, the outer diameter $OD_1$ of the first bone anchor 200 is less than approximately 4.0 mm, the outer diameter $OD_2$ of the second bone anchor 300 is less than approximately 3.0 mm, and the outer diameter $OD_4$ of the third bone anchor 400 is less than approximately 2.0 mm. In an aspect, the outer diameter $OD_4$ of the third bone anchor 400 is between approximately 1.0 mm and 2.0 mm.

The head 402 includes an annular body 410 that defines a radially inner surface 412 an opposing radially outer surface 414, a proximal, or upper, end 402a and a distal, or lower, end 402b. The outer surface 414 extends concentrically about an axis $C_3$, and can define the shape of a frustum as illustrated having an outer diameter $OD_5$ or cross-sectional dimension that increases in a direction from the distal end 402b of the head 402 toward the proximal end 402a. Alternatively, the head 402 can assume any suitable alternative shape as desired, such as a segment of a sphere as illustrated, having a cross sectional dimension (e.g. diameter) that is greater at a location between the proximal and distal ends 402a and 402b than at either of the proximal and distal ends 402a and 402b. In the illustrated embodiment, the central axis $C_3$ is parallel and coincident or aligned with the longitudinal axis $L_3$ of the shaft 404, though it should be appreciated that the central axis $C_3$ could be angularly offset from the longitudinal axis $L_3$ if desired. In an aspect, the head 402 can include a configuration substantially similar to a configuration of the head 302 of the second bone anchor 300.

The distal end 402b of the head 402 is coupled to the proximal end 404a of the shaft 404, either directly as illustrated, or indirectly via an unthreaded neck 415 of the type described above with respect to the first bone anchor

200. The head 402 includes helical threads 418 that extend radially out from the outer surface 414 of the annular body 410. The helical threads 418 are configured to threadedly purchase with corresponding threads of the shaft bore 205. It will be appreciated that the third bone anchor 400 can provide as a locking screw as illustrated. Alternatively, the third bone anchor 400 can be provided as a compression screw, a nail, rivet, or pin whose shaft is smooth or ribbed, as desired.

The head 402 further defines a central axis $D_3$ defined by the proximal and distal ends 402a and 402b. In particular, the central axis $D_3$ extends in a direction normal with respect to the proximal and distal ends 402a and 402b. Because the central axis $C_3$ of the head 402 extends parallel to the direction extending between the proximal and distal ends 402a and 402b in the illustrated embodiment, the axes $C_3$ and $D_3$ are coincident or aligned, and thus extend parallel and coincident or aligned with the longitudinal axis $L_3$ in the illustrated embodiment. It will be appreciated that the proximal and distal ends 402a and 402b can be geometrically configured such that the axes $C_3$ and $D_3$ are angularly offset from each other.

The threads 418 of the head 402 define an outer diameter $OD_5$ that increases in a direction from the distal end 402b of the head 402 to the proximal end 402a of the head 402. Thus, the outer diameter of the threads 418 is greater at the proximal end 402a than at the distal end 402b. The inner diameter of the threads 219 of the head bore 216 of the first bone anchor 200 can define a cross-sectional dimension (e.g. an inner diameter) that increases in a direction from a distal end to a proximal end of the bore 216, such that the threads 318 of the head 302 of the second anchor member 300 are configured to mate with the threads 219 of the head bore 216 of the first anchor member 200. It will be appreciated that the cross-sectional dimensions (e.g. diameters) of the threads 219 and 318 can be constant across the corresponding proximal and distal ends.

The anchor-in-anchor fixation system 100 can be assembled by inserting the first bone anchor 200, the second bone anchor 300, and the third bone anchor 400 into a target area of a bone. In particular, the head bore 216 of the first bone anchor 200 is configured to receive the second bone anchor 300, and the shaft bore 205 of the first bone anchor 200 is configured to receive the third bone anchor 400. During use, a surgeon forms an incision to access a targeted area of the underlying bone 90. Then the first bone anchor 200 is driven, for instance screwed, into the underlying bone 90 such that the threads 206 of the shaft 204 engage and attach the first bone anchor 200 to at least one of the underlying bone segments 90a, 90b, and 90c. The first bone anchor 200 is inserted into the underlying segment or segments, such as bone segments 90a and 90c, to a sufficient depth. The bone anchor 200 is rotated until axis $H_1$ of the head bore 216 and axis $S_1$ of the shaft bore 205 are aligned with desired fixation locations of the bone segments 90a, 90b, and 90c. Once the first bone anchor 200 has been fastened to the underlying bone, the second bone anchor 300 and the third bone anchor 400 are inserted into the underlying bone 90. The second bone anchor 300 is inserted through the head 202 of the first bone anchor 200. The second bone anchor 300 can be inserted into the underlying bone 90 through the same incision that received the first bone anchor 200, or through a second incision as desired. The third bone anchor 400 can be inserted through the shaft 204 of the first bone anchor 200. The third bone anchor 400 can be inserted into the underlying bone 90 through a second incision, or through the same incision that received the first bone anchor 200. The bone anchors 200, 300, and 400 can be self-tapping, and thus include cutting flutes, or a bore can be pre-drilled into the bone 90 prior to insertion of the anchors 200, 300, and 400 into the bone 90.

In an aspect, the first bone anchor 200 is inserted through a first fractured bone segment 90a and fastened to a third fractured bone segment 90c. The underlying bone 90 can be a long bone, such as a distal radius, or other long bone such as, for example, a femur humorous, tibia or ulna, as desired. The second bone anchor 300 is inserted through the first fractured bone segment 90a and fastened to a second fractured bone segment 90b. The third bone anchor 400 is inserted through the third fractured bone segment 90c and fastened to the second fractured bone segment 90b. For instance, the first bone anchor 200 can be fastened to the shaft or intramedullary portion of a patient's distal radius, while the second bone anchor 300 and the third bone anchor 400 can be fastened to a head portion of the fractured patient's radius. In this regard, the anchor-in-anchor fixation system 100 can be used to fix a radius fracture. It will be appreciated that the fixation system 100 and surgical methods of using the system can be applicable in other surgical procedures to couple one or more bones or bone fragments.

Figure 12:
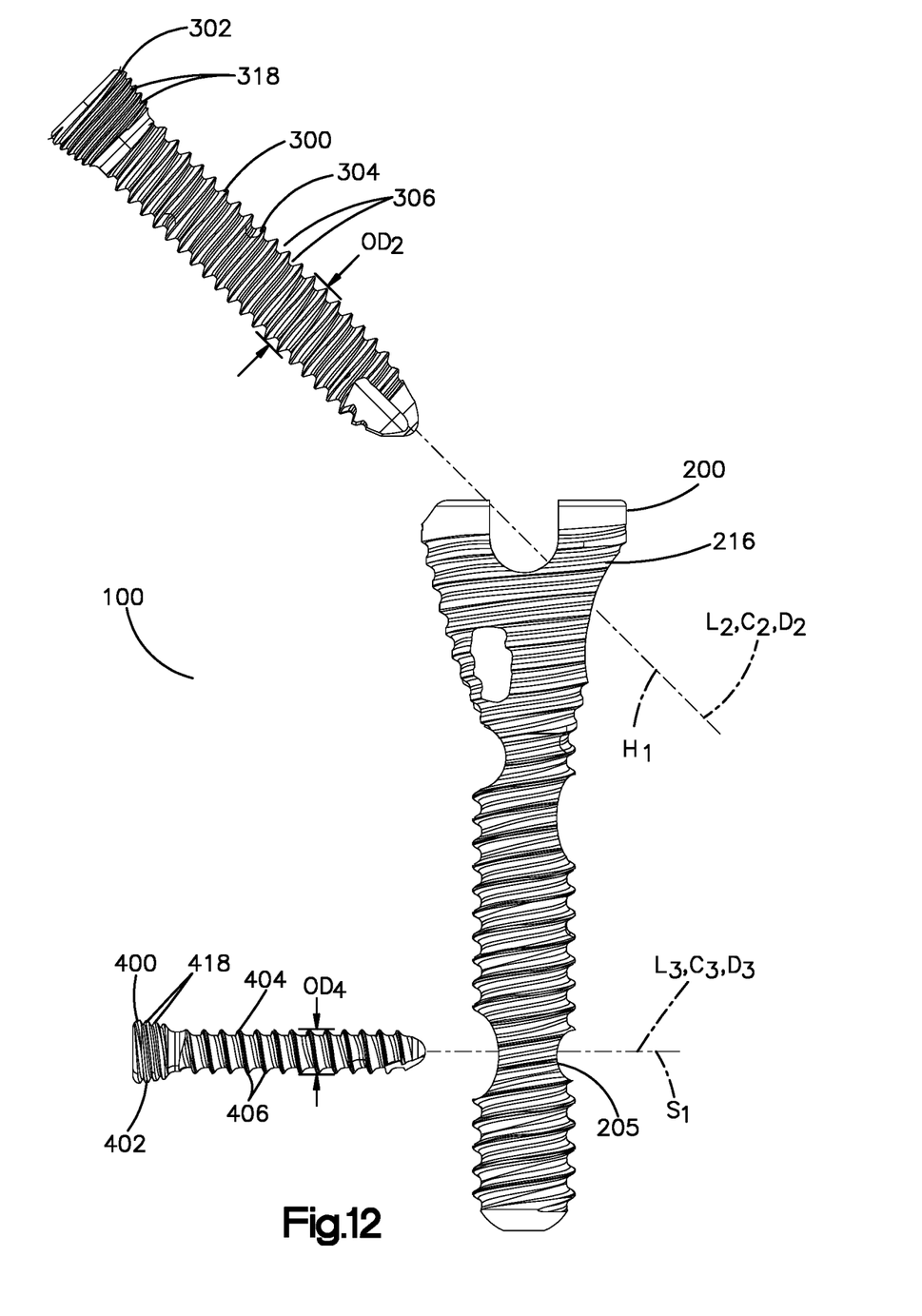
FIG. 12 illustrates an exploded view of an anchor-in-anchor fixation system, according to an aspect of this disclosure.

FIG. 12 illustrates an exploded view of the anchor-in-anchor fixation system 100, according to an aspect of this disclosure. The other diameter $OD_2$ of the threads 306 of the second bone anchor 300 is less than the inner diameter of the head bore 216 of the first bone anchor 200, such that the shaft 304 can be driven linearly through the head bore 216. Alternatively, the outer diameter $OD_2$ can be sized such that the threads 306 can engage the threads 219 of the head bore 216 as the second bone anchor 300 is rotated therein. The outer threads 318 of the head 302 of the second bone anchor 300 are configured to mate with threads 219 of the head bore 216. The shaft 304 of the second bone anchor 300 can be driven through the head bore 216 of the first bone anchor 200 until either the distal end 304b of the shaft 304 engages the underlying bone 90, or the threads 318 engage and are secured to the threads 219 of the head bore 216.

In an aspect, the other diameter $OD_4$ of the threads 406 of the third bone anchor 400 is less than the inner diameter of the shaft bore 205 of the first bone anchor 200, such that the shaft 404 can be driven linearly through the shaft bore 205. Alternatively, the shaft bore 205 can be threaded, such that the outer diameter $OD_4$ is sized such that the threads 406 engage threads of the shaft bore 205 as the third bone anchor 400 is rotated therein. The outer threads 418 of the head 402 of the third bone anchor 400 are configured to mate with threads of the shaft bore 205. The shaft 404 of the third bone anchor 400 can be driven through the shaft bore 205 of the first bone anchor 200 until either the distal end 404b of the shaft 404 engages the underlying bone 90, or the threads 418 engage or are secured to the threads and/or internal surface of the shaft bore 205. For example, the shaft 404 of the third bone anchor 400 may be driven through the shaft bore 205 of the first bone anchor 200 such that only a portion of the shaft 404 extends through the shaft bore 205, and the head portion 402 is spaced away from the first bone anchor 100 (see e.g. FIG. 1).

The third bone anchor 400 may be aligned with the shaft bore 205 of the first bone anchor 200 using a navigation or reference array system. The navigation system may include a reference array operatively mounted to the fixation system 100. The navigation system can provide spatial reference information to a surgeon performing the surgical procedure to implant the fixation system 100. The navigation system can locate the spatial reference points to determine the positioning of the third bone anchor 400 relative to the first bone anchor 200 and/or patient anatomy. The navigation system can be configured to work with a variety of reference array systems that are known and used in the art. The navigation system can also receive information related to magnetic resonance imaging (MM), computed tomography (CT), ultrasound imaging, or other image data set of the underlying bone 90. The navigation system can provide real time information that allows the surgeon to precisely align the third bone anchor 400 with the first bone anchor 200 and a target location within the patient.

During insertion of the fixation system 100, the first and second bone anchors 200 and 300 can be rotated with respect to each other to longitudinally advance the shaft 304 of the second bone anchor 300 into the bone 90, and to longitudinally advance the head 302 inside the head 202 of the first bone anchor 200 at the same rate as the advancement of the shaft 304 into the bone 90, such that the first and second bone anchors 200 and 300 are locked together. In this regard, the second bone anchor 300 can attach to the first bone anchor 200 without compressing the first bone anchor 200 against the underlying bone 90. Alternatively, the head 302 of the second bone anchor 300 can be devoid of threads or be partially threaded, and the inner surface of the head bore 216 can be devoid of threads or partially threaded, such that the engagement of the head 302 of the second bone anchor 300 against the head 202 of the first bone anchor causes the first bone anchor 200 to compress against the underlying bone 90. The radially inner surface 312 of the head 302 can be engaged by a driving instrument to drive the second bone anchor through the head bore 216 and into the underlying bone 90. In an aspect, a tool can be used to grip and/or secure the first bone anchor 200 to prevent rotation of the first bone anchor 200 while the second bone anchor 300 is being inserted through the head bore 216.

In an aspect, the second bone anchor 300 engages the underlying bone 90 prior to engagement of the threads 318 of the second bone anchor and the threads 219 of the first bone anchor 200. Once the first and second bone anchors 200 and 300 have been fully mated, the head 302 of the second bone anchor 300 is at least partially nested within the head 202 of the first bone anchor 200. In an aspect, the head 302 is fully nested within the head 202 such that the distal end 202a of the first bone anchor 200 is located distal to the distal end 302a of the second bone anchor 300.

After the first bone anchor 200 and the second bone anchor 300 are inserted into the underlying bone 90, the third bone anchor 400 can be inserted through the shaft bore 205 of the first bone anchor 200 and fastened to the underlying bone 90 as described above. Each of the first, second, and third bone anchors 200, 300, and 400 can be aligned on the same plane. The third bone anchor 400 can provide additional stability to the fixation system 100. For example, if the third bone anchor 400 is inserted through the shaft bore 205 and is angularly offset from the shaft 204 of the first bone anchor 200, the first bone anchor 200 and the second bone anchor 300 can be substantially prevented from shifting distally away from their respective intended target locations within the underlying bone 90. In an aspect, the third bone anchor 400 can be substantially perpendicular to the shaft 204 of the first bone anchor 200. Alternatively, the third bone anchor 400 can be angularly offset from the shaft 204 of the first bone anchor 200 at an angle of less than 90 degrees.

The anchor-in-anchor fixation system 100 can be used to treat simple fractures, partially comminuted fractures, and more complex fractures. The anchor-in-anchor fixation system 100 can be applied inside the envelope of the underlying bone 90, such that there is no prominence that is commonly associated with plating, while still restoring and stabilizing the anatomy so bone healing can occur.

Figure 13:
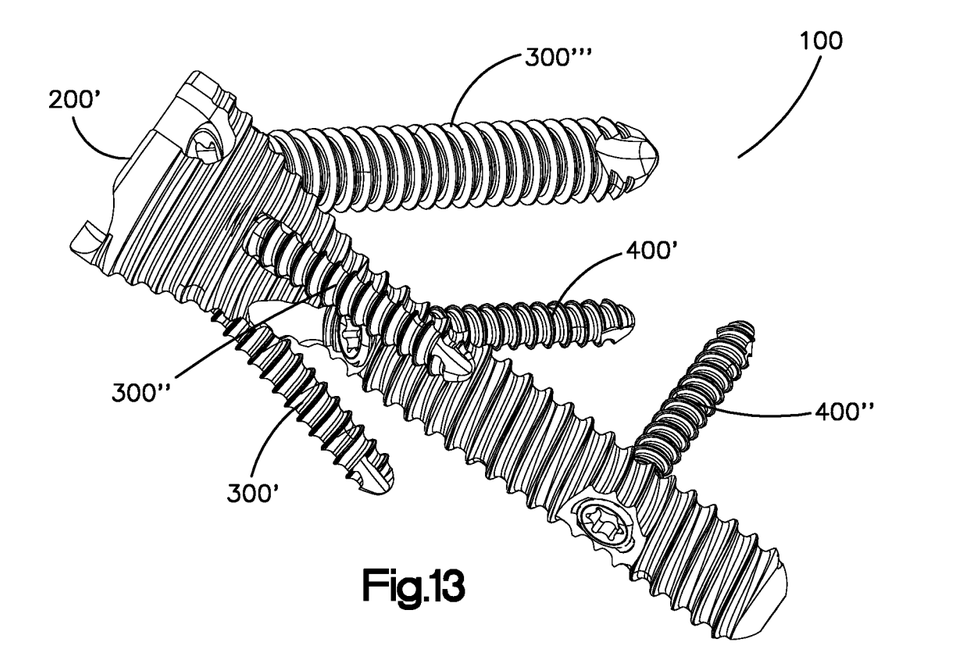
FIG. 13 illustrates a perspective view of an alternate aspect of an anchor-in-anchor fixation system, according to an aspect of this disclosure.
Figure 14:
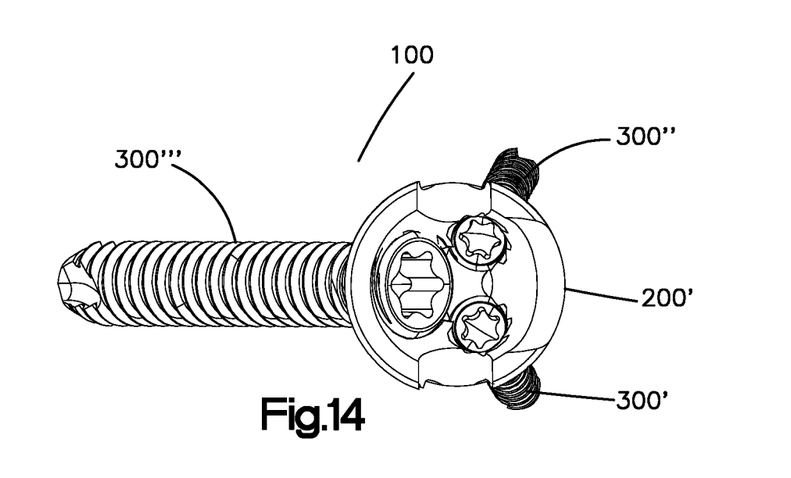
FIG. 14 illustrates a top view of the anchor-in-anchor fixation system shown in FIG. 13, according to an aspect of this disclosure.

FIGS. 13 and 14 illustrate a perspective view and a top view of an alternate aspect of the anchor-in-anchor fixation system 100, according to an aspect of this disclosure. Alternatively or additionally, the fixation system 100 can include a plurality (e.g. greater than one) of head bores and a plurality of shaft bores. The fixation system 100 includes bone anchor 200', multiple head anchors 300', 300", and 300''', and multiple shaft anchors 400' and 400". Each of the head anchors 300', 300", and 300''' may be inserted through respective head bores of the bone anchor 200' in a substantially similar manner as the second bone anchor 300 is inserted through the head bore 216 of the first bone anchor 200 as described above. The head anchors 300', 300", and 300''' can have substantially similar cross-sectional dimensions (e.g. diameter). Alternatively, the head anchors 300', 300", and 300''' can have substantially similar cross-sections and/or can have different cross-sectional dimensions from each other. Each respective head of each head anchor 300', 300", and 300''' can either be fully nested or partially nested within the head of the bone anchor 200'. Each of the head anchors 300', 300", and 300''' can be spaced apart from one another about the head 200'.

Each shaft anchor 400' and 400" may be inserted through a respective shaft bore of the bone anchor 200' in a substantially similar manner as the third bone anchor 400 is inserted through the shaft bore 205 of the first bone anchor 200. Each shaft anchor 400' and 400" can extend through the bone anchor 200' substantially parallel to one another. Alternatively, shaft anchor 400' can be angularly offset from shaft anchor 400" when each shaft anchor 400' and 400" are positioned within the shaft. As illustrated, the bone anchor 200' includes three head bores and two shaft bores. It will be appreciated that the bone anchor 200' may include fewer or more head bores and shaft bores configured to receive respective head anchors and shaft anchors.

The anchor-in-anchor fixation system 100 may be used in with a variety of tools for inserting, setting, and aligning the system 100 within the bone. For example, targeting instruments, probes, locators, sensors, field generators, guide wires, removal hook instruments, or other tools/components may be used with the system 100 for performing the medical procedure. The anchor-in-anchor fixation system 100 can be used in long bone applications, shoulder prosthesis, spinal applications, and can be used for stand-alone fixation whereby the bone anchors directly affix underlying bone segments, or can include one or more auxiliary fixation devices such as bone plates, nails, screws, implants, and spacers. It should be noted that it is not intended for any of the anchor-in-anchor systems as described herein to be limited to the particularly identified procedures and/or applications unless specifically noted.

It will be appreciated that the foregoing description provides examples of the disclosed system and method. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

What is claimed is:

1. A bone fixation system configured to anchor to bone, the bone fixation system comprising:
   a bone anchor including:
   a head that defines a threaded head bore extending through the head along a head bore axis; and
   a fully threaded shaft extending from the head along a shaft axis and configured to be driven into bone, wherein the bone anchor defines a threaded shaft bore, and an entirety of the shaft bore extends through the shaft along a shaft bore axis that is angularly offset with respect to the shaft axis;
   an auxiliary shaft anchor sized to be inserted through the shaft bore of the bone anchor along the shaft bore axis and driven into bone, the auxiliary shaft anchor having a respective head that is configured to threadedly mate with the bone anchor in the shaft bore; and
   an auxiliary head anchor sized to be inserted through the head bore of the bone anchor along the head bore axis so as to be driven into bone, the auxiliary head anchor having a respective head that is configured to threadedly mate with the bone anchor in the head bore.

2. The bone fixation system of claim 1, wherein the head bore axis and the shaft bore axis intersect each other.

3. The bone fixation system of claim 2, wherein the shaft axis and the head bore axis define an angle that is in a range from approximately 40° to approximately 50°.

4. The bone fixation system of claim 2, wherein the shaft bore has a cross-sectional dimension that is less than a cross-sectional dimension of the head bore.

5. The bone fixation system of claim 1, wherein the shaft axis and the shaft bore axis are substantially perpendicular to each other.

6. The bone fixation system of claim 1, wherein the head bore axis is angularly offset with respect to the shaft axis of the bone anchor.

7. The bone fixation system of claim 1, wherein the auxiliary shaft anchor includes an auxiliary shaft, and the auxiliary shaft is threaded.

8. The bone fixation system of claim 1, wherein the respective head of the auxiliary head anchor is configured to be at least partially disposed within the head of the bone anchor.

9. The bone fixation system of claim 1, wherein an outer surface of the head of the bone anchor tapers radially outward in a direction from the shaft to an upper end of the head.

10. The bone fixation system of claim 1, configured to directly affix bone segments without extending through any bone fixation devices.

11. The bone fixation system of claim 1, wherein the auxiliary head anchor and the auxiliary shaft anchor are sized such that when the auxiliary head anchor is fully seated in the head bore and the auxiliary shaft anchor is fully seated in the shaft bore, the auxiliary head anchor and the auxiliary shaft anchor are fully spaced from each other along their respective entireties.

12. The bone fixation system of claim 11, wherein the head of the bone anchor extends along a central head axis to the shaft, and a central axis of the head bore is oblique to the central head axis.

13. A bone fixation system configured to anchor to bone, the bone fixation system comprising:
   a bone anchor including:
   a head that defines a head bore extending through the head along a central head bore axis; and
   a fully threaded shaft extending from the head along a shaft axis and configured to be driven into bone, wherein the head of the bone anchor extends along a central head axis to the shaft, and the central head bore axis is oblique to the central head axis,
   wherein the bone anchor defines a shaft bore, and an entirety of the shaft bore extends through the shaft along a shaft bore axis that is angularly offset with respect to the shaft axis;
   an auxiliary head anchor having a threaded auxiliary head anchor head and an auxiliary head anchor shaft that extends from the auxiliary head anchor head and is sized to be inserted through the head bore of the bone anchor along the head bore axis so as to be driven into bone, wherein the auxiliary head anchor head is configured to threadedly purchase with the bone anchor in the head bore, and
   an auxiliary shaft anchor having a threaded auxiliary shaft anchor head and an auxiliary shaft anchor shaft that extends from the auxiliary shaft anchor head and is sized to be inserted through the shaft bore of the bone anchor along the shaft bore axis and driven into bone, wherein the auxiliary shaft anchor head is configured to threadedly purchase with the bone anchor in the shaft bore,
   wherein the auxiliary head anchor and the auxiliary shaft anchor are sized such that when the auxiliary head anchor is fully seated in the head bore and the auxiliary shaft anchor is fully seated in the shaft bore, the auxiliary head anchor and the auxiliary shaft anchor are fully spaced from each other along their respective entireties, and
   wherein when the auxiliary head anchor head and the auxiliary shaft anchor head are threadedly purchased with the bone anchor in the head bore and the shaft bore, respectively, the auxiliary head anchor and the auxiliary shaft anchor are oriented such that a common plane extends through the auxiliary head anchor head, the auxiliary shaft anchor head, the auxiliary head anchor shaft, and the auxiliary shaft anchor shaft.

14. The bone fixation system of claim 13, configured for stand-alone fixation whereby the bone anchor, the auxiliary head anchor, and the auxiliary shaft anchor directly affix bone segments without extending through any other bone fixation devices.

15. The bone fixation system of claim 13, wherein respective entireties of the bone anchor, the auxiliary head anchor, and the auxiliary shaft anchor are threaded.

* * * * *